(12) United States Patent
Fast et al.

(10) Patent No.: US 11,607,076 B2
(45) Date of Patent: *Mar. 21, 2023

(54) WAFFLE IRON PLATE

(71) Applicant: THE FAST FAMILY TRUST, DATED JUL. 27, 2009, BRIAN J. FAST AND JULIE A. FAST, TRUSTEES, Laguna Beach, CA (US)

(72) Inventors: Brian J. Fast, Laguna Beach, CA (US); Ryan Adams, Santa Ana, CA (US)

(73) Assignee: The Fast Family Trust, Laguna Beach, CA (US), dated July 27, 2009, Brian J. Fast and Julie A. Fast, Trustees ( * ) Notice: Subject to any disclaimer, the term of this patent is extended or adjusted under 35 U.S.C. 154(b) by 580 days.

This patent is subject to a terminal disclaimer.

(21) Appl. No.: 15/805,791

(22) Filed: Nov. 7, 2017

(65) Prior Publication Data
US 2018/0055282 A1    Mar. 1, 2018

Related U.S. Application Data

(63) Continuation of application No. 13/543,725, filed on Jul. 6, 2012, now Pat. No. 9,820,609.

(51) Int. Cl.
*A47J 37/06* (2006.01)
(52) U.S. Cl.
CPC ................... *A47J 37/0611* (2013.01)
(58) Field of Classification Search
CPC .. A47J 27/60; A47J 27/62; A47J 36/02; A47J 36/38; A47J 37/04; A47J 37/06; A47J 37/067; A47J 37/0605; A47J 37/0611; A47J 37/0623; A47J 37/0629; A47J 37/0676; A47J 2037/06; A47J 2037/0611; F24C 15/10; F24C 15/102; H05B 6/02; H05B 6/062
USPC ......... 99/353, 426, 427, 428, 430, 431, 432, 99/433, 439, 449, 450; 426/245, 389, 426/414, 502, 512; 249/92, 170–172, 185
See application file for complete search history.

(56) References Cited

U.S. PATENT DOCUMENTS

| 246,194 | A | * | 8/1881 | Patton | A47J 37/0611 99/377 |
| 264,867 | A | * | 9/1882 | Ege | A47J 37/0611 99/375 |
| 267,535 | A | * | 11/1882 | Hurd | A47J 37/0611 99/372 |

(Continued)

FOREIGN PATENT DOCUMENTS

| GB | 425853 | 3/1934 |
| WO | WO 2001/050878 | 7/2001 |

OTHER PUBLICATIONS http://bruxie.com/frequently-asked-questions/.
(Continued)

*Primary Examiner* — Eric S Stapleton
(74) *Attorney, Agent, or Firm* — Knobbe, Martens, Olson & Bear LLP

(57) ABSTRACT

A waffle iron plate for forming a waffle having multiple scores, the plate comprising a base having a front surface and at least two spaced-apart ribs extending from the front surface of the base and configured to form the scores, whereby the waffle may be folded along the scores so as to have a bottom portion and two side portions.

16 Claims, 6 Drawing Sheets

(56) References Cited

U.S. PATENT DOCUMENTS

| | | | | |
|---|---|---|---|---|
| 270,659 A * | 1/1883 | Griswold et al. | A47J 37/0611 | 99/374 |
| 270,973 A * | 1/1883 | Newman | A47J 37/0611 | 99/377 |
| 277,422 A * | 5/1883 | Harker et al. | A47J 37/0611 | 99/377 |
| 287,713 A * | 10/1883 | Patton | A47J 37/0611 | 99/377 |
| 534,255 A * | 2/1895 | Fleming | A47J 37/0857 | 99/340 |
| 1,314,602 A * | 9/1919 | Miglietta | A21B 5/026 | 99/375 |
| 1,450,277 A * | 4/1923 | Brown | A47J 37/0611 | 99/340 |
| 1,493,444 A * | 5/1924 | Burch | A47J 37/0611 | 99/375 |
| 1,553,989 A * | 9/1925 | Cook | A47J 37/0611 | 99/375 |
| 1,596,652 A * | 8/1926 | Giovannetti | A47J 37/1295 | 426/275 |
| 1,606,778 A * | 11/1926 | Yancey | A47J 37/0611 | 99/383 |
| 1,615,122 A * | 1/1927 | Gordon | A47J 37/0611 | 99/383 |
| 1,672,738 A * | 6/1928 | Stampley | A47J 37/1295 | 99/411 |
| 1,692,644 A * | 11/1928 | Fromknecht | A47J 37/0611 | 99/372 |
| 1,708,499 A * | 4/1929 | Filbey | A47J 37/0611 | 99/377 |
| 1,754,800 A * | 4/1930 | Preston | A47J 37/0611 | 99/374 |
| 1,907,199 A * | 5/1933 | Hurxthal | A47J 37/0611 | 99/331 |
| RE18,923 E * | 8/1933 | Harris | A47J 37/0821 | 337/303 |
| 1,947,124 A * | 2/1934 | Clauss | A47J 37/0611 | 99/380 |
| 2,009,790 A * | 7/1935 | Shroyer | A47J 37/0688 | 99/378 |
| 2,026,286 A * | 12/1935 | Abeo | A47J 37/0611 | 99/372 |
| 2,036,523 A * | 4/1936 | Freemon | A47J 37/00 | 99/335 |
| 2,474,995 A * | 7/1949 | Wade | A47G 19/02 | 220/23.8 |
| 2,570,374 A * | 10/1951 | Pompa | A47J 37/1295 | 99/416 |
| 2,627,222 A * | 2/1953 | Luna | A47J 43/20 | 99/403 |
| 2,635,528 A * | 4/1953 | Torres | A47J 37/1295 | 99/413 |
| 2,652,766 A * | 9/1953 | Cralle | A47J 37/0611 | 99/349 |
| 2,655,687 A * | 10/1953 | Miller | A47J 37/0611 | 16/371 |
| 2,664,812 A * | 1/1954 | Molina | A47J 37/1295 | 249/120 |
| 2,734,983 A * | 2/1956 | Krichton | A47J 37/0611 | 219/448.17 |
| 2,743,665 A * | 5/1956 | Gustafson | A47J 37/0611 | 99/331 |
| 2,775,929 A * | 1/1957 | Johnson | A47J 43/18 | 99/426 |
| 2,778,294 A * | 1/1957 | Ulloa | A47J 43/18 | 99/426 |
| 2,792,774 A * | 5/1957 | Veach | A47J 37/1295 | 99/426 |
| 2,814,981 A * | 12/1957 | Wendel | A47J 37/1295 | 99/426 |
| 2,847,933 A * | 8/1958 | Pate | A47J 43/18 | 249/117 |
| 2,891,814 A * | 6/1959 | Idoine | A47J 43/283 | 294/99.2 |
| 2,957,404 A * | 10/1960 | Richardson | A47J 37/1295 | 99/426 |
| 2,957,405 A * | 10/1960 | Maldonado | A47J 37/1295 | 249/120 |
| 3,007,595 A * | 11/1961 | Remley | A47J 37/10 | 220/4.22 |
| 3,020,826 A * | 2/1962 | Silva | A47J 37/1295 | 99/426 |
| 3,068,779 A * | 12/1962 | Eidlisz | A47J 36/08 | 99/416 |
| 3,108,531 A * | 10/1963 | Jepson | A47J 37/0611 | 99/331 |
| 3,121,385 A * | 2/1964 | Blackburn | A47J 37/0611 | 99/374 |
| 3,207,059 A * | 9/1965 | Hirons | A47J 37/0694 | 99/349 |
| D202,960 S * | 11/1965 | Carpenter | D7/410 | |
| 3,511,172 A * | 5/1970 | Jones | A47J 43/18 | 249/120 |
| 3,555,993 A * | 1/1971 | Garcia | A47J 37/0694 | 99/426 |
| 3,596,822 A * | 8/1971 | Holley | B65D 43/162 | 220/4.24 |
| 3,604,342 A * | 9/1971 | Harding | A47J 37/1295 | 99/426 |
| D223,006 S * | 2/1972 | Price | D7/410 | |
| 3,653,337 A * | 4/1972 | Hanson | A47J 37/1295 | 425/394 |
| 3,693,537 A * | 9/1972 | Johnson | A47J 43/18 | 99/426 |
| 3,745,911 A * | 7/1973 | Kennedy, Jr. | A47J 43/18 | 99/426 |
| 3,759,165 A * | 9/1973 | Wallace | A47J 43/18 | 99/427 |
| 3,763,764 A * | 10/1973 | Schy | A21B 5/08 | 99/353 |
| 3,799,047 A * | 3/1974 | Freeman | A47J 37/0611 | 99/332 |
| 3,817,163 A * | 6/1974 | Kizziar | A47J 43/18 | 99/353 |
| D237,935 S * | 12/1975 | Nygren | D7/410 | |
| 4,091,720 A * | 5/1978 | Wheeler | A47J 37/0611 | 99/375 |
| D249,219 S * | 9/1978 | Stence | 99/426 | |
| 4,154,155 A * | 5/1979 | Brignall | A47J 37/1295 | 99/426 |
| 4,154,156 A * | 5/1979 | Brignall | A47J 37/1295 | 99/426 |
| 4,173,926 A * | 11/1979 | Brignall | A47J 37/1295 | 294/99.2 |
| 4,181,073 A * | 1/1980 | Chapa, Sr. | A47J 37/1295 | 99/416 |
| 4,285,653 A | 8/1981 | Bronnec | | |
| 4,386,557 A * | 6/1983 | Meraj | A47J 37/0611 | 219/450.1 |
| 4,476,379 A * | 10/1984 | Andrizzi | A47J 37/0611 | 219/386 |
| 4,489,632 A * | 12/1984 | Albrecht | B26D 1/553 | 83/404.2 |
| 4,494,453 A * | 1/1985 | Bentson | A47J 37/1295 | 425/398 |
| 4,494,454 A * | 1/1985 | Sparks | A21B 5/08 | 249/175 |
| 4,517,887 A * | 5/1985 | Childress | A47J 37/1295 | 99/426 |
| 4,530,275 A * | 7/1985 | Stickle | A47J 37/1214 | 425/292 |
| 4,535,688 A * | 8/1985 | Bentson | A47J 37/1295 | 425/398 |
| 4,554,865 A * | 11/1985 | Caridis | A47J 37/1214 | 99/353 |
| D281,942 S * | 12/1985 | Bentson | D7/674 | |
| 4,729,589 A * | 3/1988 | Puskar | A47J 43/28 | 294/26.5 |

(56) References Cited

U.S. PATENT DOCUMENTS

| | | | | |
|---|---|---|---|---|
| 4,750,414 A * | 6/1988 | Dohrs | | A47J 37/0694 |
| | | | | 211/204 |
| 4,773,316 A * | 9/1988 | Dougherty | | A47J 37/12 |
| | | | | 99/397 |
| D299,300 S * | 1/1989 | Lie | | D7/361 |
| 4,803,918 A * | 2/1989 | Carbon | | A47J 37/0611 |
| | | | | 219/524 |
| 4,854,227 A * | 8/1989 | Koopman | | A47J 37/1295 |
| | | | | 99/416 |
| 4,903,923 A * | 2/1990 | Krentel | | A47F 5/13 |
| | | | | 248/151 |
| 4,929,458 A | 5/1990 | Smietana | | |
| D310,946 S * | 10/1990 | White | | D7/683 |
| 4,987,827 A * | 1/1991 | Marquez | | A47J 37/0611 |
| | | | | 99/331 |
| D326,592 S * | 6/1992 | Denton | | D7/504 |
| 5,129,313 A * | 7/1992 | Coppier | | A47J 37/0611 |
| | | | | 219/524 |
| D330,149 S * | 10/1992 | Weimer | | D7/672 |
| 5,236,727 A * | 8/1993 | Huston | | A21D 13/42 |
| | | | | 426/138 |
| 5,284,672 A | 2/1994 | Ito | | |
| 5,299,492 A * | 4/1994 | Carbon | | A21B 5/023 |
| | | | | 219/524 |
| 5,400,704 A * | 3/1995 | Huston | | A21D 8/06 |
| | | | | 219/729 |
| 5,596,922 A * | 1/1997 | Chan | | A47J 37/0611 |
| | | | | 99/372 |
| 5,606,905 A * | 3/1997 | Boehm | | A47J 37/0611 |
| | | | | 126/369 |
| 5,613,426 A * | 3/1997 | Chan Gabbai | | A47J 37/0611 |
| | | | | 99/375 |
| 5,615,604 A * | 4/1997 | Chenglin | | A47J 37/0611 |
| | | | | 219/386 |
| 5,628,245 A * | 5/1997 | Baze | | A47J 37/01 |
| | | | | 249/120 |
| 5,671,658 A * | 9/1997 | Macasaet | | A47J 37/0611 |
| | | | | 99/374 |
| 5,707,474 A | 1/1998 | Andersen et al. | | |
| D392,153 S * | 3/1998 | Wright | | D7/410 |
| 5,809,871 A * | 9/1998 | Arathoon | | A47J 37/0611 |
| | | | | 99/380 |
| 5,937,742 A * | 8/1999 | Steeb | | A47J 37/0611 |
| | | | | 99/375 |
| 5,937,743 A * | 8/1999 | Overstreet | | A47J 43/283 |
| | | | | 99/353 |
| 5,983,784 A * | 11/1999 | Goldberg | | A47J 37/0611 |
| | | | | 99/372 |
| 5,988,048 A * | 11/1999 | Hunter | | A47J 36/20 |
| | | | | 99/413 |
| 6,027,753 A * | 2/2000 | Reeves | | A21D 8/06 |
| | | | | 426/144 |
| 6,130,416 A * | 10/2000 | Gabbai | | A47J 37/0611 |
| | | | | 219/524 |
| 6,397,730 B1 * | 6/2002 | Steinbach | | A47J 37/0611 |
| | | | | 99/331 |
| 6,412,400 B1 * | 7/2002 | Gambino | | A47J 37/0611 |
| | | | | 99/372 |
| 6,427,581 B1 * | 8/2002 | Wu | | A47J 37/0611 |
| | | | | 99/332 |
| 6,429,409 B1 * | 8/2002 | Siu | | A47J 37/0611 |
| | | | | 219/450.1 |
| 6,487,963 B1 | 12/2002 | Wu | | |
| 6,555,795 B2 * | 4/2003 | Glucksman | | A47J 37/0611 |
| | | | | 219/450.1 |
| 6,658,992 B2 * | 12/2003 | Zelander | | A21B 3/18 |
| | | | | 99/353 |
| 6,776,085 B1 * | 8/2004 | Tang | | A47J 37/0676 |
| | | | | 219/386 |
| 6,860,191 B2 * | 3/2005 | Jackson | | A47J 37/0611 |
| | | | | 99/340 |
| D503,593 S * | 4/2005 | Walker | | D7/672 |
| 6,889,602 B2 * | 5/2005 | Brady | | A47J 37/0611 |
| | | | | 99/372 |
| D543,073 S * | 5/2007 | Rich | | D7/410 |
| 7,441,496 B2 * | 10/2008 | Romano | | A47J 37/0611 |
| | | | | 99/349 |
| D589,294 S * | 3/2009 | Averty | | D7/356 |
| D595,326 S | 6/2009 | Geidel | | |
| 7,543,530 B2 * | 6/2009 | Cohn | | A47J 36/16 |
| | | | | 99/403 |
| 7,638,740 B1 * | 12/2009 | Hradecky | | A47J 37/0611 |
| | | | | 219/520 |
| 7,669,522 B2 * | 3/2010 | Cohen | | A47J 37/0611 |
| | | | | 99/375 |
| 7,752,958 B2 * | 7/2010 | Cohen | | A47J 37/0864 |
| | | | | 99/375 |
| 7,866,257 B2 * | 1/2011 | Vasquez | | A47J 37/1295 |
| | | | | 99/426 |
| D643,678 S * | 8/2011 | Lavy | | D7/364 |
| 7,989,012 B2 * | 8/2011 | Gambino | | A47J 37/0676 |
| | | | | 426/505 |
| 8,061,268 B1 * | 11/2011 | McGuinness | | A47J 36/027 |
| | | | | 99/422 |
| 8,151,696 B2 * | 4/2012 | Lubowicki | | A47J 37/0611 |
| | | | | 99/375 |
| D696,058 S * | 12/2013 | Crockett, Jr. | | D7/354 |
| 8,692,164 B2 * | 4/2014 | Krishnan | | A47J 37/0611 |
| | | | | 219/450.1 |
| D730,118 S * | 5/2015 | Fast | | D7/410 |
| 9,186,021 B1 * | 11/2015 | Dover | | A47J 37/1295 |
| D755,010 S * | 5/2016 | Wu | | D7/409 |
| 9,820,609 B2 * | 11/2017 | Fast | | A47J 37/0611 |
| 2004/0020370 A1 * | 2/2004 | Jackson | | A47J 37/0611 |
| | | | | 99/331 |
| 2004/0182256 A1 * | 9/2004 | Losoya | | A47J 37/1295 |
| | | | | 99/426 |
| 2004/0187708 A1 * | 9/2004 | Waldstrom | | A23G 9/28 |
| | | | | 99/455 |
| 2004/0263077 A1 * | 12/2004 | Kao | | H01J 11/12 |
| | | | | 313/582 |
| 2005/0217492 A1 * | 10/2005 | Albritton | | A47J 37/0611 |
| | | | | 99/372 |
| 2005/0223907 A1 * | 10/2005 | Albritton | | A47J 37/0611 |
| | | | | 99/372 |
| 2005/0223908 A1 * | 10/2005 | Albritton | | A47J 37/0611 |
| | | | | 99/372 |
| 2005/0271982 A1 * | 12/2005 | Setsuda | | H01J 11/36 |
| | | | | 430/321 |
| 2006/0027555 A1 * | 2/2006 | Aisenbrey | | A47J 37/0611 |
| | | | | 219/385 |
| 2006/0117963 A1 * | 6/2006 | Schneider | | A47J 43/18 |
| | | | | 99/403 |
| 2006/0147587 A1 * | 7/2006 | Kovich | | A21C 15/025 |
| | | | | 426/138 |
| 2006/0201333 A1 * | 9/2006 | Friel | | A47J 37/0611 |
| | | | | 99/372 |
| 2006/0283334 A1 * | 12/2006 | Ho | | A47J 37/0611 |
| | | | | 99/372 |
| 2007/0157823 A1 * | 7/2007 | Cohen | | A47J 37/0885 |
| | | | | 99/372 |
| 2007/0186785 A1 * | 8/2007 | Cohen | | A47J 37/0871 |
| | | | | 99/372 |
| 2008/0014324 A1 * | 1/2008 | Darnell | | A21D 13/42 |
| | | | | 426/549 |
| 2008/0105137 A1 * | 5/2008 | Genslak | | A47J 37/0611 |
| | | | | 99/350 |
| 2008/0175959 A1 * | 7/2008 | Hill | | A23P 10/10 |
| | | | | 426/90 |
| 2008/0245241 A1 * | 10/2008 | Rosset | | A21B 5/023 |
| | | | | 99/375 |
| 2008/0257169 A1 * | 10/2008 | Tienor | | A47J 37/0611 |
| | | | | 99/377 |
| 2009/0145307 A1 * | 6/2009 | Lubowicki | | A47J 37/0611 |
| | | | | 99/375 |
| 2010/0005975 A1 * | 1/2010 | Mitchell | | A21C 11/02 |
| | | | | 99/382 |

(56) References Cited

U.S. PATENT DOCUMENTS

2011/0126720 A1\* 6/2011 Galvin .................. A47J 37/0611
                                                         99/378
2014/0007780 A1\* 1/2014 Fast .................... A47J 37/0611
                                                         99/372
2018/0055282 A1\* 3/2018 Fast .................... A47J 37/0611

OTHER PUBLICATIONS http://www.waffleandwolf.com.
http://www.ideann.com/3in1-sandwich-panini-and-waffle-press.html.
http://www.wafflesandwichmaker.com/.
http://www.swiss-miss.com/2007/05/they_keyboard_w.html.
http://www.bizrate.com/waffle-makers/sandwich-waffle-maker/.
Tidbits, Apr. 12, 2005, Time Magazine.

\* cited by examiner

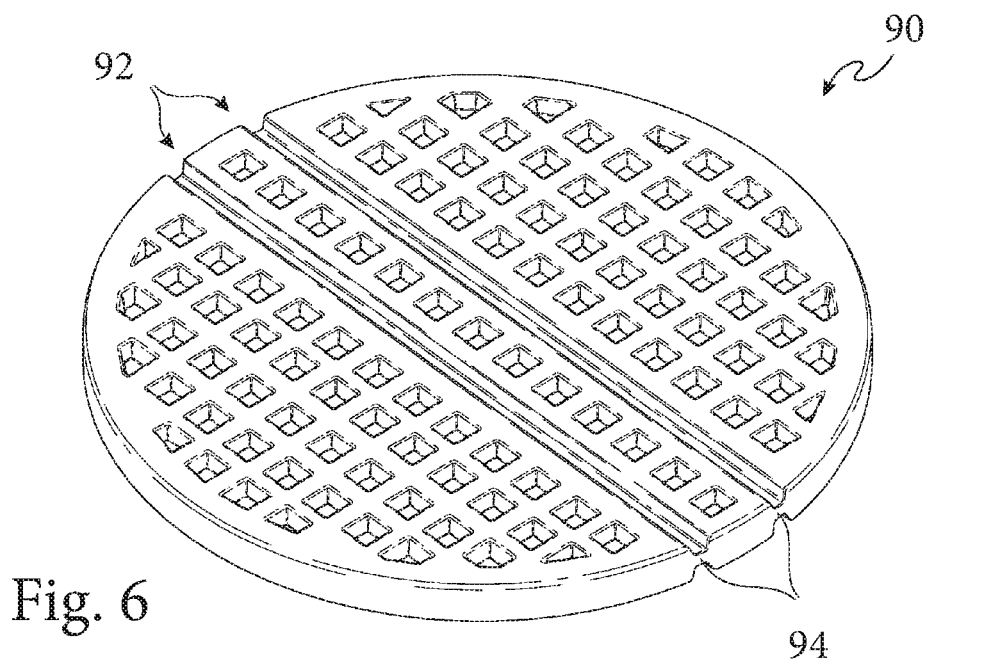
Fig. 6
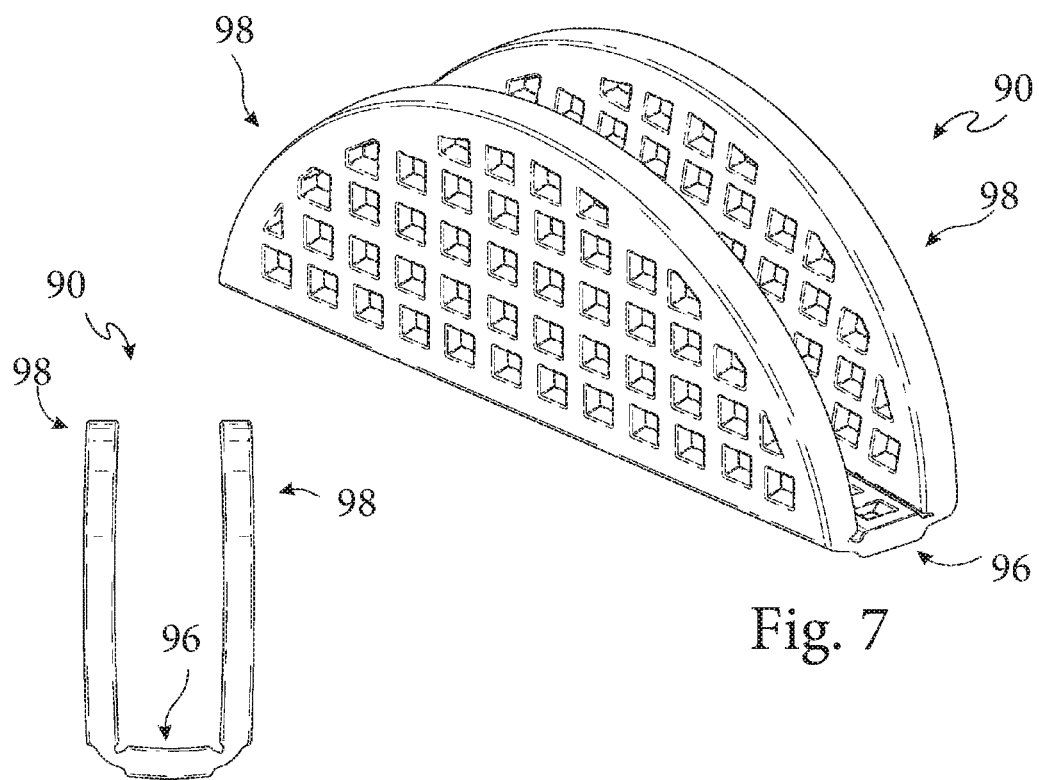
Fig. 7
Fig. 8

WAFFLE IRON PLATE

INCORPORATION BY REFERENCE

Applicant(s) hereby incorporate herein by reference any and all U.S. patents and U.S. patent applications cited or referred to in this application.

BACKGROUND OF THE INVENTION

Field of the Invention

Aspects of this invention relate generally to waffle plate, and more particularly to new and improved waffle iron plates.

Description of Related Art

As is known in the art, a waffle iron is a cooking appliance used to make waffles. Most waffle irons generally comprise two hinged plates, each being formed with a grid pattern of bumps and recesses designed to form the typical honeycomb waffle. The plates are then connected to an electrical source for selectively heating each plate. Accordingly, each plate is typically made of iron or some other heat conductive material, often with a non-stick coating or other surface treatment. Once the waffle iron is heated, batter is poured between the plates, and the plates are closed together to cook or bake the waffle.

Oftentimes, each waffle iron plate is configured to form multiple waffles, usually two or four, with a scored area between each of the waffles for easy separation after the waffles are cooked. Each score may be formed by a single pair of ribs, one on each of the respective two plates and so configured to be adjacent when the plates are brought together for cooking the waffles. In other designs, each waffle iron plate is configured to form a single waffle, most often having either a square or round shape, in which case there are typically no scores because there are no waffles to separate after cooking.

Recently waffles have been folded substantially in half as a means of holding food or other savory items. However, current waffle configurations are not made to be folded and subsequently the waffle breaks and/or falls apart when taken by customers to consume. This creates an unpleasant and frustrating experience for the customer and materially prevents a viable business model as the types of foods held by the waffle are limited by the waffle design. The invention described herein resolves these problems and allows for the introduction of a variety of new offerings to consumers in which foods not normally associated with waffles can be combined and presented in an easy to consume and handle from that does not break.

Aspects of the present invention fulfill these needs and provide further related advantages as described in the following summary.

SUMMARY OF THE INVENTION

Aspects of the present invention teach certain benefits in construction and use which give rise to the exemplary advantages described below.

In an exemplary embodiment, a waffle iron plate according to aspects of the invention is configured for forming a waffle having multiple scores, the plate comprising a base having a front surface and at least two spaced-apart ribs extending from the front surface of the base and configured to form the scores, whereby the waffle may be folded along the scores so as to have a bottom portion and two side portions.

A primary objective inherent in the above-described plate and method of use is to provide advantages not taught by the prior art.

Another objective is to provide such a plate that is configured to form a waffle that is selectively foldable.

Another objective is to provide such a plate that allows for a waffle that is pliable and affords a unique crispness.

Another objective is to provide such a plate that makes waffles that are more conducive to holding a variety of food contents.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 6 is a perspective view of an exemplary embodiment of a waffle produced in accordance with the exemplary embodiment shown in FIGS. 1-5; and FIG. 7 is a perspective view of the waffle of FIG. 6 now in a folded configuration.

FIG. 8 is a front view of the waffle of FIG. 6 in a folded configuration.

Figure 1:
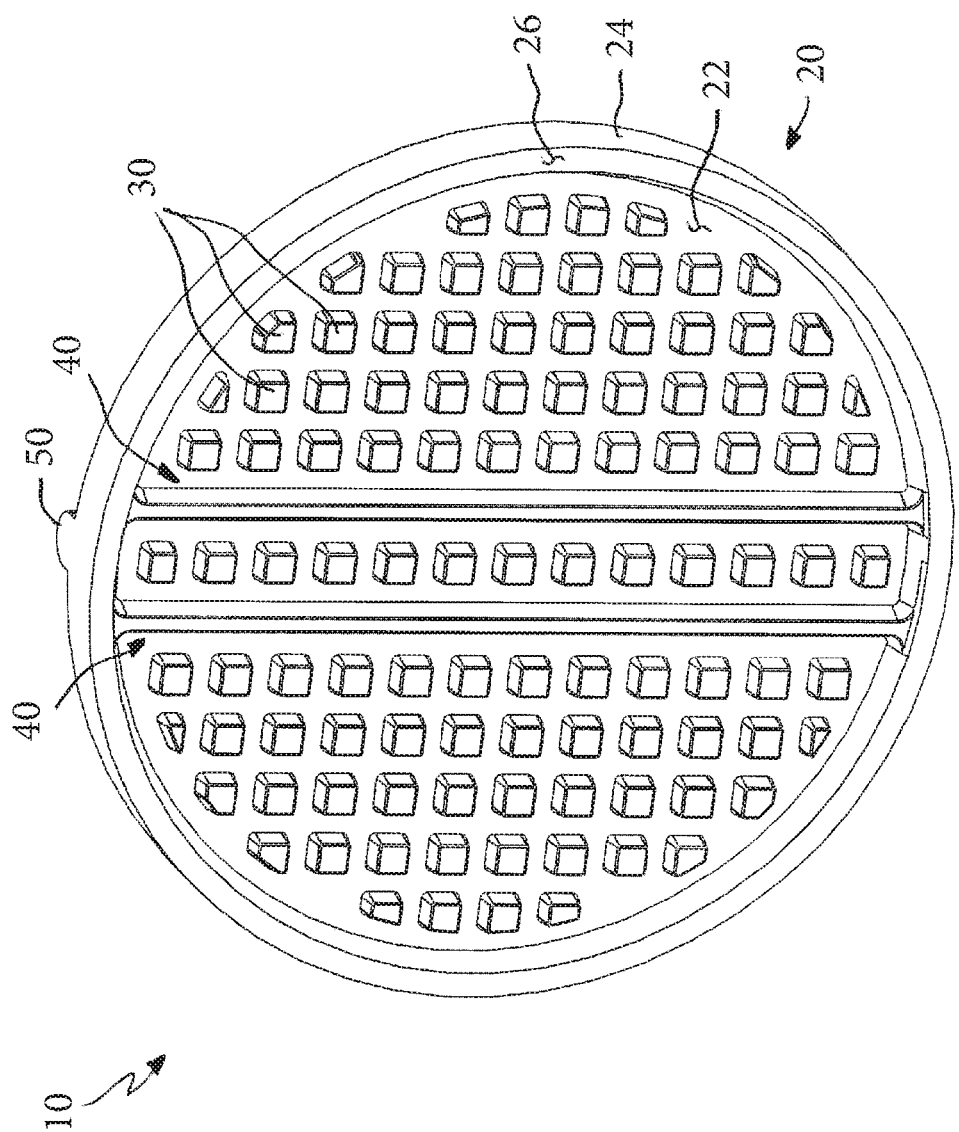
FIG. 1 is a perspective view of an exemplary embodiment of the invention.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. To accomplish the above and related objects, this invention may be embodied in the form illustrated in the accompanying drawings, attention being called to the fact, however, that the drawings are illustrative only, and that changes may be made in the specific construction illustrated.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claims are set forth below in a certain combination, it must be expressly understood that the invention includes other combinations of fewer, more of different elements, which are disclosed herein even when not initially claimed in such combinations.

The above-described drawing figures illustrate aspects of the invention in at least one of its exemplary embodiments, which are further defined in detail in the following description.

Referring first to FIG. 1, there is shown a perspective view of an exemplary waffle iron plate 10 according to aspects of the present invention. While a particular grid pattern is shown as being formed by substantially square, spaced-apart bumps 30 and respective spaces therebetween, it will be appreciated that such grid pattern is merely illustrative and that the invention is not so limited. Similarly, the overall shape of the plate 10 shown as being round is also to be understood as merely exemplary and non-limiting, as is the substantially planar configuration of the plate, it being appreciated that the plate in whole or in part may also be curved. In addition, although the inventor describes the invention as a waffle iron plate, one can appreciate that any heat conductive material that have similar characteristics as iron can be used as the plate material.

In the exemplary embodiment, the waffle iron plate 10 generally comprises a base 20 having a front surface 22 and an outer wall 24 extending from the base 20 substantially about its perimeter and terminating in a front perimeter edge 26 configured for engaging an opposite plate (not shown) when operably installed in a waffle iron appliance (not shown). Along the base 20 in a substantially repeating pattern as bounded by the outer wall 24 there are again formed extending substantially outwardly from the front surface 22 spaced-apart bumps 30, in the exemplary embodiment being substantially square in profile, except that in locations adjacent the outer wall 24 such bumps may be truncated in a manner known in the art to yield a substantially uniform recess channel between the resulting grid pattern of bumps 30 and the outer wall 24. Both the bumps 30 and the outer wall 24 may be formed with vertical walls extending from the base 20 that are tapered so as to facilitate removal of the cooked waffle 90 (FIG. 6) in a manner known in the art.

Figure 2:
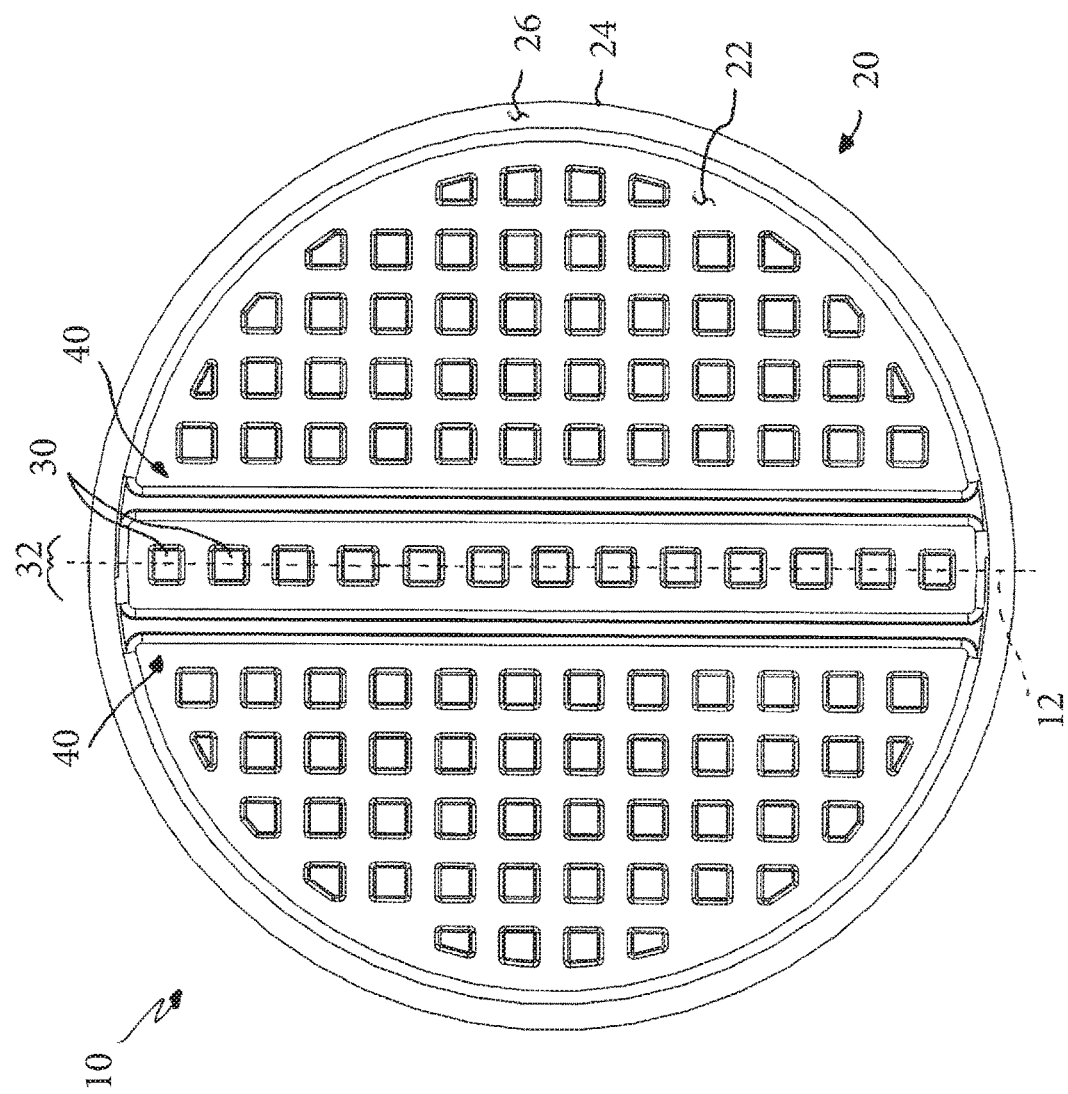
FIG. 2 is a front view thereof.

With reference now to FIGS. 1 and 2, two spaced-apart and substantially parallel ribs 40 are formed so as to also extend from the front surface 22 of the base 20 within the grid pattern of bumps 30. In the exemplary embodiment, the ribs 40 are equidistant from the centerline 12 of the circular waffle iron plate 10 and span the distance from one side of the plate 10 to the other, thereby intersecting the outer wall 24 at opposite ends and bounding therebetween one row 32 of bumps 30. It will be appreciated by those skilled in the art that when two such plates 10 are then brought together to form a waffle 90 (FIGS. 6 and 7), the ribs 40 on opposite plates 10 being thus adjacent and being sized and configured to allow the flow of batter therebetween thus serve to form parallel "relief scores" in the resulting waffle 90 that facilitate folding of the cooked waffle 90, as explained in further detail below in connection with FIGS. 6 and 7. It is to be understood that while a particular size and shape of waffle iron plate 10 and resulting waffle 90 are shown, the invention is not so limited. Rather, a variety of configurations of the waffle iron plate beyond that shown are possible without departing from the spirit and scope of the invention. For example, the ribs 40 may be configured to not connect with the outer wall 24, may be closer together so as to not have any bumps 30 therebetween or may be further apart and have two or more rows of bumps 30 therebetween, may be formed to not be equidistant from the centerline 12 or not be parallel to each other, or may be discontinuous so as to effectively form a perforated or undulating score in the finished waffle 90, any and all such variations thus enabling configurations of the cooked and folded waffle 90 different from that shown in FIG. 7. Moreover, while two ribs 40 are shown and described in the exemplary embodiment, it will be appreciated that other quantities, spacing, and configurations of the ribs may be employed in the present invention as well. Again, those skilled in the art will appreciate that such variations are possible in the present invention without departing from its spirit and scope.

Figure 3:
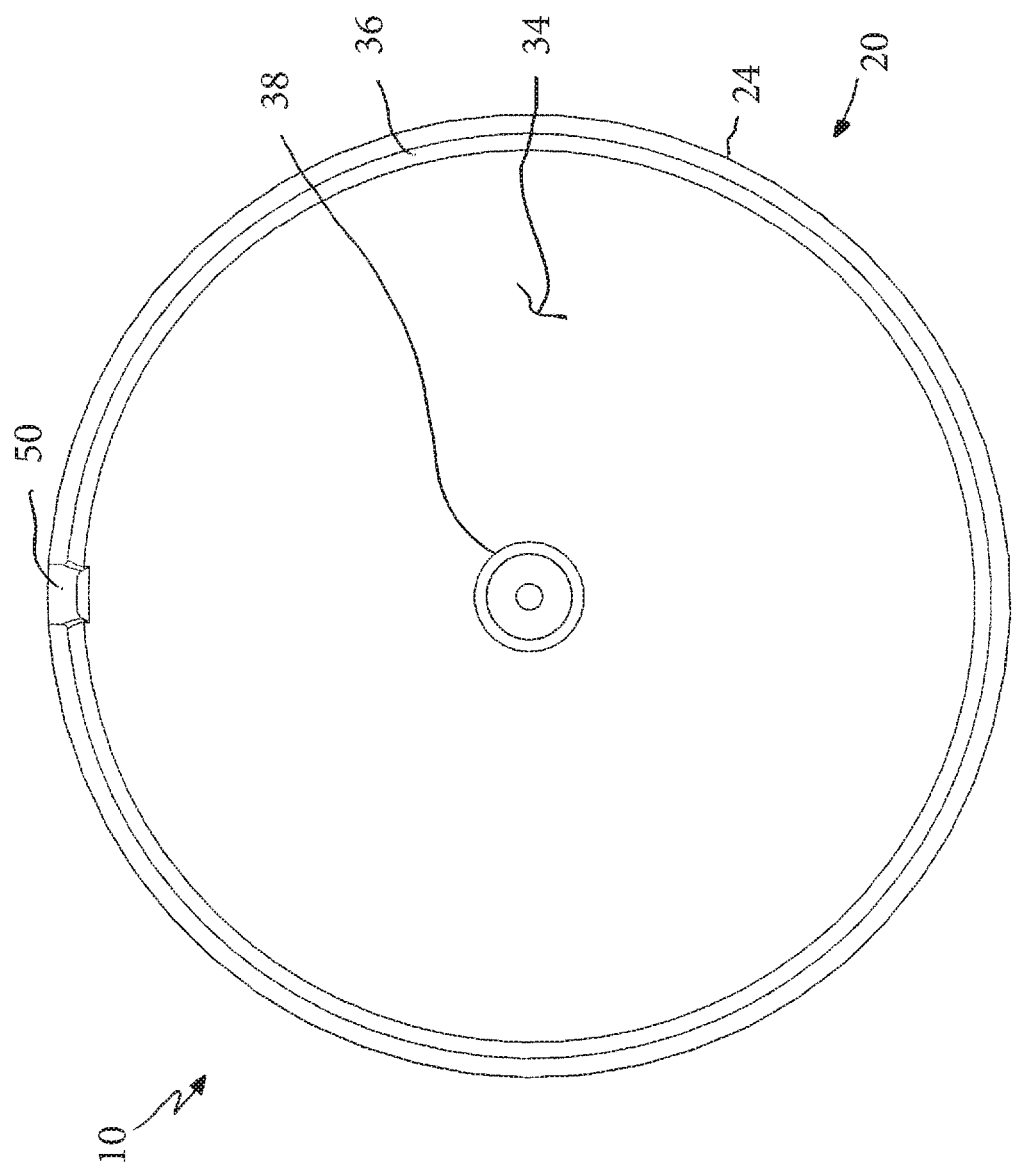
FIG. 3 is a back view thereof.
Figure 4:
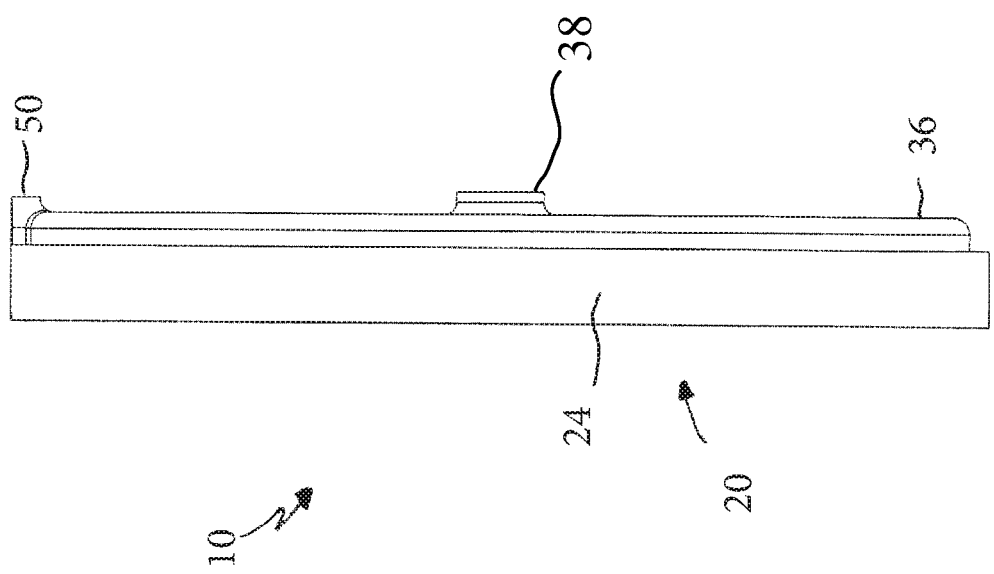
FIG. 4 is a side view thereof.
Figure 5:
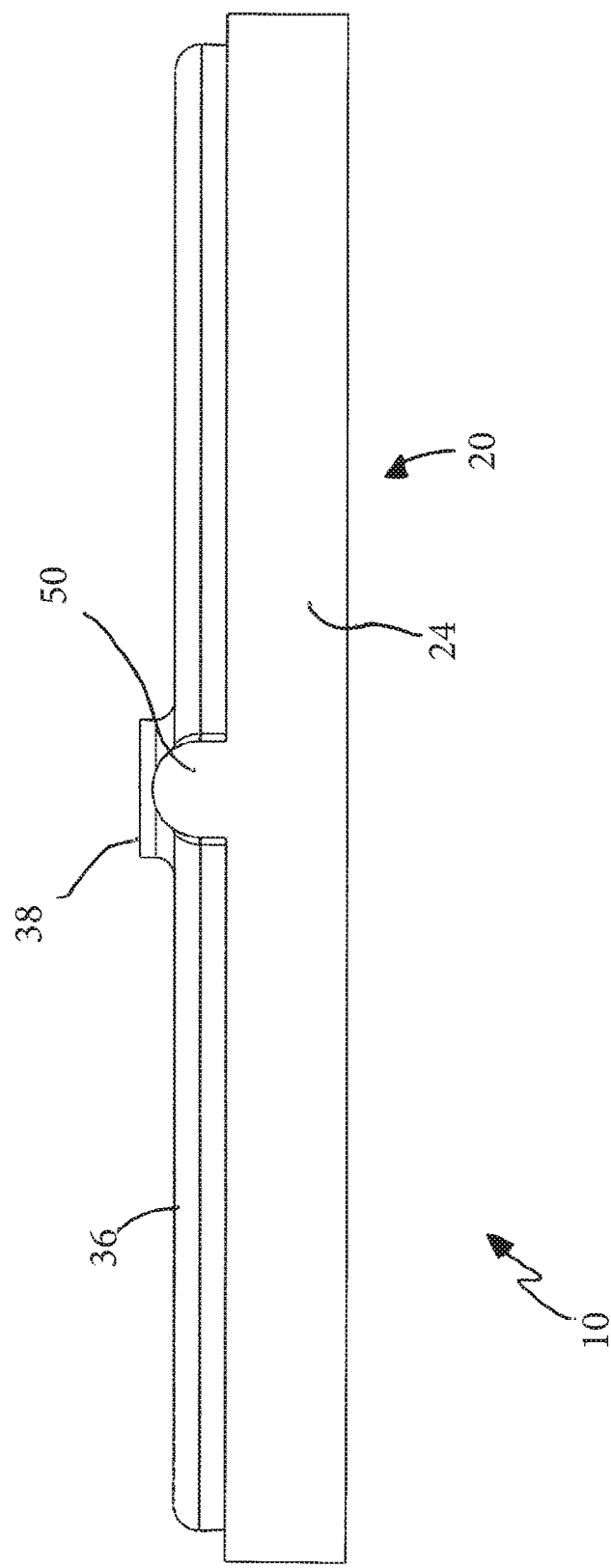
FIG. 5 is an enlarged top view thereof.

Turning now to FIGS. 3-5, showing back, side, and top views of the exemplary waffle iron plate 10, it can be seen that the outer wall 24, or the base 20 more generally, may be formed with an indexing feature 50 configured to engage a corresponding notch or other feature in the waffle iron itself (not shown) such that when the plate 10 is installed the orientation of particularly the ribs 40 relative to any such waffle iron is assured. It will be appreciated by those skilled in the art that by forming such an indexing feature 50 on each such plate 10, the plates will be capable of being installed in a given waffle iron in a common orientation, whereby the ribs 40 of the respective plates are properly aligned so as to form the relief scores 92 in each waffle 90 (FIG. 6) as described above and further below. While the indexing feature 50 is shown as being a single somewhat rounded protrusion extending from the outer wall 24 opposite the front perimeter edge 26, it will be further appreciated that any feature or features by which the respective plate 10 may be indexed or keyed to a waffle iron in which it is installed may be employed.

Finally, with reference to particularly FIG. 3, the waffle iron plate 10 is shown as having a flange 36 substantially about the perimeter of the back surface 34. Furthermore, the plate 10 is also shown as being formed on its back surface 34 with a central boss 38 that extends from the base 20 substantially opposite the bumps 30 and ribs 40 formed on the front surface 22. Any such structure on the back surface 34 as needed for operation of the waffle iron plates 10 in conjunction with a particular waffle iron, whether now known or later developed, may be employed in the present invention without departing from its spirit and scope.

In use, two waffle iron plates according to aspects of the present invention, such as the exemplary plate 10 shown in FIGS. 1-5 as described above, are installed within a waffle iron (not shown), with the indexing feature 50 on each plate 10 again serving to properly orient the plates within the iron. Each such plate 10 is also configured for receipt of electrical power in any manner now known or later developed for the purpose of heating up and cooking waffle batter to form a waffle. Referring now to FIG. 6, it will be appreciated by those skilled in the art that when batter (not shown) is poured between the two plates 10 so configured and operably installed within a waffle iron appliance and the plates 10 are then brought together to form a waffle 90, the ribs 40 on opposite plates thereby being brought substantially adjacent and being sized and configured to allow the flow of batter therebetween thus serve to form parallel relief scores 92 in the resulting waffle 90, while the batter also flows around the pattern of bumps 30 in a manner known in the art to form the basic honeycomb waffle configuration. It will be further appreciated that the relief scores 92 serve to form spaced-apart, parallel living hinges 94 that allow the cooked waffle 90, once removed from the plate 10, to be folded in the two locations as shown in FIG. 7. The resulting folded waffle 90 has a substantially planar bottom portion 96 between the two scores 92 and two substantially planar side portions 98 extending from the respective scores 92 substantially perpendicular to the bottom portion 96, the bottom and side portions 96, 98 cooperating for improved retention of food or other savory items (not shown) within the folded waffle 90. In the exemplary embodiment, the waffle bottom portion 96 is relatively smaller than the respective two waffle side portions 98, though it will again be appreciated that the locations of the relief scores 92 as dictated by the ribs 40 formed on the plate 10 may vary, and thus the proportionality of the bottom and side portions 96, 98 of the waffle 90, without departing from the spirit and scope of the invention. It will be further appreciated that the height of the ribs 40 defines the depth of the scores 92 and thus the thickness of the living hinges 94 of the final cooked waffle 90, which also may be varied depending on the type of batter, the intended use and overall design of the waffle, and other such factors, with an objective being that the folded waffle 90 be relatively resistant to tearing along the hinges 94 during use. Once more, those skilled in the art will appreciate that while a particular size and shape of waffle iron plate 10 and resulting waffle 90 are shown, the invention is not so limited. Rather, a variety of configurations of the waffle iron plate beyond that shown are possible without departing from the spirit and scope of the invention.

The incorporation of ribs 40 and relief scores 92 in combination with the arrangement of the bumps 30 results in a folded waffle 90 that is more pliable and contains a unique crispness not before achievable in the known industry. Such resulting folded waffle 90 improves the user's experience and satisfaction when holding food and eating food contained in the folded waffle 90. In addition, the addition of ribs 40 and relief scores 92 may lower the folded waffle 90 production time by reducing the number of bumps 30 required on the waffle plate thereby improving the speed and efficiency for the operators to produce more folded waffles 90 in a given time.

As shown in FIG. 8, the substantially planar bottom 96 allows an improved area to hold a variety of food and the two hinges 94 increases the pliability and durability of the overall waffle 90.

It should be noted that the various features of each above-described embodiment may be combined in any logical manner and are intended to be included within the scope of the present invention. It will also be appreciated by those skilled in the art that the present invention is not limited to the particular geometries and materials of construction disclosed, but may instead entail other functionally comparable structure, now known or later developed, without departing from the spirit and scope of the invention. Furthermore, while aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A waffle plate for forming a foldable waffle having multiple folding scores, the waffle plate comprising:
   a base having a front surface;
   an uninterrupted outer wall formed as a single piece with the base and extending from the front surface and located around a perimeter of the base, the outer wall terminates in a flat end surface opposite the front surface, wherein the flat end surface defines a closed, uninterrupted perimeter that lies within a single plane, wherein an entirety of the outer wall has a consistent height relative to the front surface and forms an outer boundary of a waffle-forming space of the waffle plate;
   at least two spaced-apart ribs formed as a single piece with the base and originating at the front surface of the base and extending from the front surface of the base, wherein the at least two spaced-apart ribs are configured to form the folding scores of the foldable waffle, wherein each of the folding scores have an open side extending along an entire length of each respective one of the folding scores, wherein the at least two spaced-apart ribs divide the waffle-forming space into a bottom-forming portion between the at least two spaced-apart ribs and a pair of side-forming portions on opposing sides of the at least two spaced-apart ribs, wherein each of the side-forming portions is larger than the bottom-forming portion whereby the waffle may be folded along the folding scores so as to have a bottom portion and two larger side portions.

2. The waffle plate of claim 1, wherein the at least two spaced-apart ribs intersect the outer wall.

3. The waffle plate of claim 1, wherein the at least two spaced-apart ribs are parallel.

4. The waffle plate of claim 1, wherein the at least two spaced-apart ribs are equidistant from a centerline of the waffle plate.

5. The waffle plate of claim 1, further comprising a plurality of bumps extending from the front surface of the base, wherein the at least two spaced-apart ribs are formed within the plurality of bumps so as to bound therebetween a single row of bumps.

6. The waffle plate of claim 1, further comprising an indexing feature having an indexing surface configured to engage an indexing structure of a waffle iron with which the waffle plate is used.

7. The waffle plate of claim 1, wherein each of the at least two spaced-apart ribs is continuous between a first end at a first junction with the outer wall and a second end at a second junction with the outer wall.

8. The waffle plate of claim 1, wherein the perimeter of the base is circular in shape.

9. A waffle plate for forming a foldable waffle having at least two folding scores, the waffle plate comprising:
   a base having a front surface;
   an uninterrupted outer wall formed as a single piece with the base and extending from the front surface and located around a perimeter of the base, the outer wall terminates in a flat end surface opposite the front surface, wherein the flat end surface defines a closed, uninterrupted perimeter that lies within a single plane, wherein an entirety of the outer wall has a consistent height relative to the front surface and forms an outer boundary of a waffle-forming space of the waffle plate;
   at least two spaced-apart ribs formed as a single piece with the base and extending from the front surface of the base and configured to form the folding scores of the foldable waffle, wherein the at least two spaced-apart ribs divide the waffle-forming space into a bottom-forming portion between the at least two spaced-apart ribs and a pair of side-forming portions on opposing sides of the at least two spaced-apart ribs, wherein a maximum width of each of the side-forming portions is greater than a maximum width of the bottom-forming portion, whereby the foldable waffle may be folded along the folding scores so as to have a bottom portion and two side portions.

10. The waffle plate of claim 9, wherein the at least two spaced-apart ribs intersect the outer wall.

11. The waffle plate of claim 9, wherein the at least two spaced-apart ribs are parallel.

12. The waffle plate of claim 9, wherein the at least two spaced-apart ribs are equidistant from a centerline of the waffle plate.

13. The waffle plate of claim 9, further comprising a plurality of bumps extending from the front surface of the base, wherein the at least two spaced-apart ribs are formed within the plurality of bumps so as to bound therebetween a single row of bumps.

14. The waffle plate of claim 9, further comprising an indexing feature having an indexing surface configured to engage an indexing structure of a waffle iron with which the waffle plate is used.

15. The waffle plate of claim 9, wherein each of the at least two spaced-apart ribs is continuous between a first end at a first junction with the outer wall and a second end at a second junction with the outer wall.

16. The waffle plate of claim 9, wherein the perimeter of the base is circular in shape.

\* \* \* \* \*